(12) United States Patent
Schmidt et al.

(10) Patent No.: US 10,023,124 B2
(45) Date of Patent: Jul. 17, 2018

(54) LUGGAGE COMPARTMENT FOR A VEHICLE

(71) Applicant: FORD GLOBAL TECHNOLOGIES, LLC, Dearborn, MI (US)

(72) Inventors: David Schmidt, Dearborn, MI (US); Uday Kiran Patil, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 82 days.

(21) Appl. No.: 15/351,468

(22) Filed: Nov. 15, 2016

(65) Prior Publication Data

US 2018/0134222 A1    May 17, 2018

(51) Int. Cl.
| | |
|---|---|
| *B60R 5/02* | (2006.01) |
| *B60K 20/02* | (2006.01) |
| *B60K 26/02* | (2006.01) |
| *B62D 25/20* | (2006.01) |
| *B60N 2/015* | (2006.01) |

(52) U.S. Cl.
CPC ............... *B60R 5/02* (2013.01); *B60K 20/02* (2013.01); *B60K 26/02* (2013.01); *B60N 2/01508* (2013.01); *B62D 25/20* (2013.01); *B60L 2260/32* (2013.01); *G05D 2201/0212* (2013.01)

(58) Field of Classification Search
CPC .. B60R 5/02; B60R 7/02; B60R 7/043; B60R 7/06; B62D 25/20; B62D 1/283; B60K 20/02; B60K 26/02; B60L 2260/32; G05D 2201/0212

See application file for complete search history.

(56) References Cited

U.S. PATENT DOCUMENTS

| | | | | |
|---|---|---|---|---|
| 3,058,769 | A | * | 10/1962 | Willson .................... B60P 3/36 108/44 |
| 5,195,795 | A | | 3/1993 | Cannera et al. |
| 5,338,081 | A | | 8/1994 | Young et al. |
| 5,419,478 | A | | 5/1995 | Mauro et al. |
| 6,102,463 | A | | 8/2000 | Swanson et al. |
| 6,345,856 | B1 | * | 2/2002 | Minai ................ B60N 2/01583 296/65.03 |
| 6,360,149 | B1 | * | 3/2002 | Kwon .................... B60K 35/00 114/144 R |
| 7,429,068 | B2 | | 9/2008 | Busha et al. |

(Continued)

FOREIGN PATENT DOCUMENTS

| | | |
|---|---|---|
| CN | 205553959 U | 9/2016 |
| FR | 2832678 A1 * | 5/2003 ............... B60R 7/06 |

(Continued)

OTHER PUBLICATIONS

UK Search Report dated Apr. 18, 2018 re GB Appl. 1718604.0.

*Primary Examiner* — Laura Freedman
(74) *Attorney, Agent, or Firm* — Frank A. MacKenzie; Bejin Bieneman PLC

(57) ABSTRACT

A vehicle includes a seat mount, and a luggage compartment. The instrument panel has a steering-wheel opening. The luggage compartment is attachable to the seat mount and covers the steering-wheel opening when attached to the seat mount. The luggage compartment may be used when the vehicle is fully autonomous and/or may equip the vehicle that may have originally been built for nonautonomous or semiautonomous operation into a fully autonomous vehicle.

20 Claims, 12 Drawing Sheets

(56) References Cited

U.S. PATENT DOCUMENTS

| | | | |
|---|---|---|---|
| 8,215,695 B2 | 7/2012 | Ida et al. | |
| 8,260,482 B1 * | 9/2012 | Szybalski | B62D 1/286 |
| | | | 701/23 |
| 8,356,853 B2 | 1/2013 | Huber et al. | |
| 8,360,519 B1 | 1/2013 | Hsu | |
| 9,096,150 B2 | 8/2015 | Cuddihy et al. | |
| 9,126,538 B1 | 9/2015 | Day | |
| 9,194,168 B1 * | 11/2015 | Lu | E05F 15/70 |
| 9,199,553 B2 * | 12/2015 | Cuddihy | B60N 2/005 |
| 9,802,638 B1 * | 10/2017 | Stoffel | B62D 1/26 |
| 9,845,103 B2 * | 12/2017 | Lubischer | B62D 1/183 |
| 2014/0260761 A1 * | 9/2014 | Soderlind | B62D 1/181 |
| | | | 74/493 |
| 2015/0084386 A1 | 3/2015 | Hellman et al. | |
| 2017/0174203 A1 * | 6/2017 | Brown | B60R 21/205 |
| 2017/0225570 A1 * | 8/2017 | El Aile | B60R 21/205 |

FOREIGN PATENT DOCUMENTS

| | | | | |
|---|---|---|---|---|
| GB | 2548005 A | | 9/2017 | |
| JP | 2008230286 A | * | 10/2008 | |
| JP | 2008230287 A | * | 10/2008 | B60R 7/04 |
| JP | 2008230288 A | * | 10/2008 | |
| JP | 2008238858 A | * | 10/2008 | |
| JP | 2008239001 A | * | 10/2008 | |
| WO | 2014131964 A | | 9/2014 | |

\* cited by examiner

LUGGAGE COMPARTMENT FOR A VEHICLE

BACKGROUND

Autonomous vehicles have the ability to operate without the intervention of a human operator, e.g., driver, that is, a vehicle controller makes decisions about accelerating, braking, and/or steering the vehicle. A vehicle may be fully autonomous or semi-autonomous. A semi-autonomous vehicle may be autonomous only in particular situations, for example, highway driving or parallel parking, or with respect to certain vehicle subsystems, for example, braking but not acceleration or steering.

DETAILED DESCRIPTION

Figure 1:
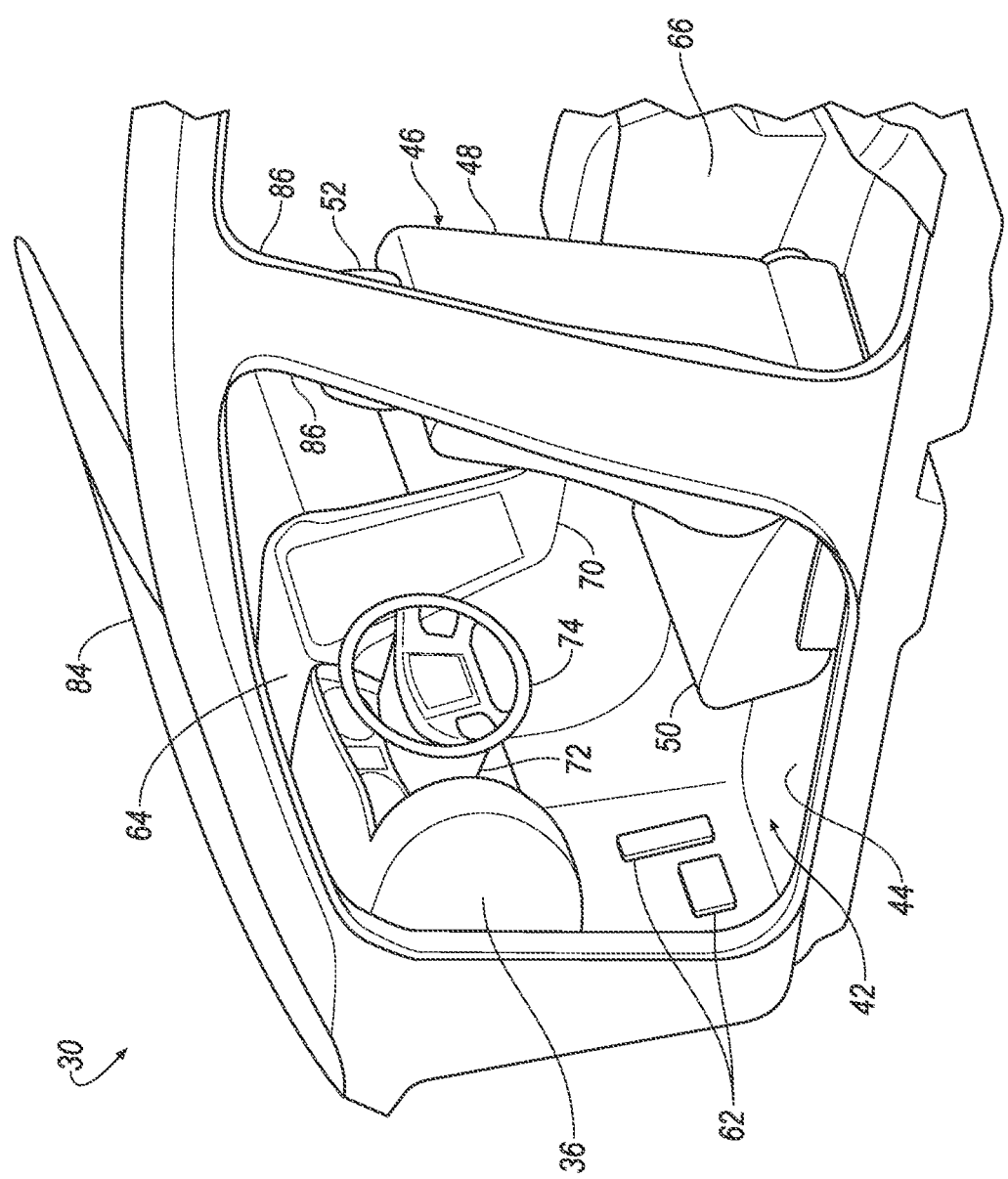
FIG. 1 is a side perspective view of a portion of a vehicle including a seat.

With reference to the Figures, wherein like numerals indicate like parts throughout the several views, a vehicle 30 includes a seat mount 34, an instrument panel 36, and a luggage compartment 32. The instrument panel 36 has a steering-wheel opening 38. The luggage compartment 32 is attachable to the seat mount 34 and covers the steering-wheel opening 38 when attached to the seat mount 34.

The luggage compartment 32 may be used when the vehicle 30 is fully autonomous and/or may equip the vehicle 30 that may have originally been built for nonautonomous or semiautonomous operation into a fully autonomous vehicle. When fully autonomous, the vehicle includes a controller 40 capable of operating the vehicle 30 independently of the intervention of a human driver, completely or to a greater or a lesser degree. The controller 40 may be programmed to operate the engine, braking system, steering, and/or other vehicle systems. Occupants of the vehicle 30 may be kept from operating or attempting to operate the vehicle 30 by the luggage compartment 32. The vehicle 30 with the luggage compartment 32 may be more useful for, for example, ride-hailing or ride-sharing, deliveries, etc.

The Society of Automotive Engineers (SAE) has defined multiple levels of autonomous vehicle operation. At levels 0-2, a human driver monitors or controls the majority of the driving tasks, often with no help from the vehicle. For example, at level 0 ("no automation"), a human driver is responsible for all vehicle operations. At level 1 ("driver assistance"), the vehicle sometimes assists with steering, acceleration, or braking, but the driver is still responsible for the vast majority of the vehicle control. At level 2 ("partial automation"), the vehicle can control steering, acceleration, and braking under certain circumstances without human interaction. At levels 3-5, the vehicle assumes more driving-related tasks. At level 3 ("conditional automation"), the vehicle can handle steering, acceleration, and braking under certain circumstances, as well as monitoring of the driving environment. Level 3 requires the driver to intervene occasionally, however. At level 4 ("high automation"), the vehicle can handle the same tasks as at level 3 but without relying on the driver to intervene in certain driving modes. At level 5 ("full automation"), the vehicle can handle almost all tasks without any driver intervention. The vehicle 30 may operate in one or more of the levels of autonomous vehicle operation. As used herein, nonautonomous modes of operation may refer to levels 0-1, partially autonomous modes of operation may refer to levels 2-3, and fully autonomous modes of operation may refer to levels 4-5.

With reference to FIGS. 1-4 and 6-11, the vehicle 30 includes a passenger cabin 42 to house occupants, if any, of the vehicle 30. The passenger cabin 42 includes a floor 44.

Figure 3:
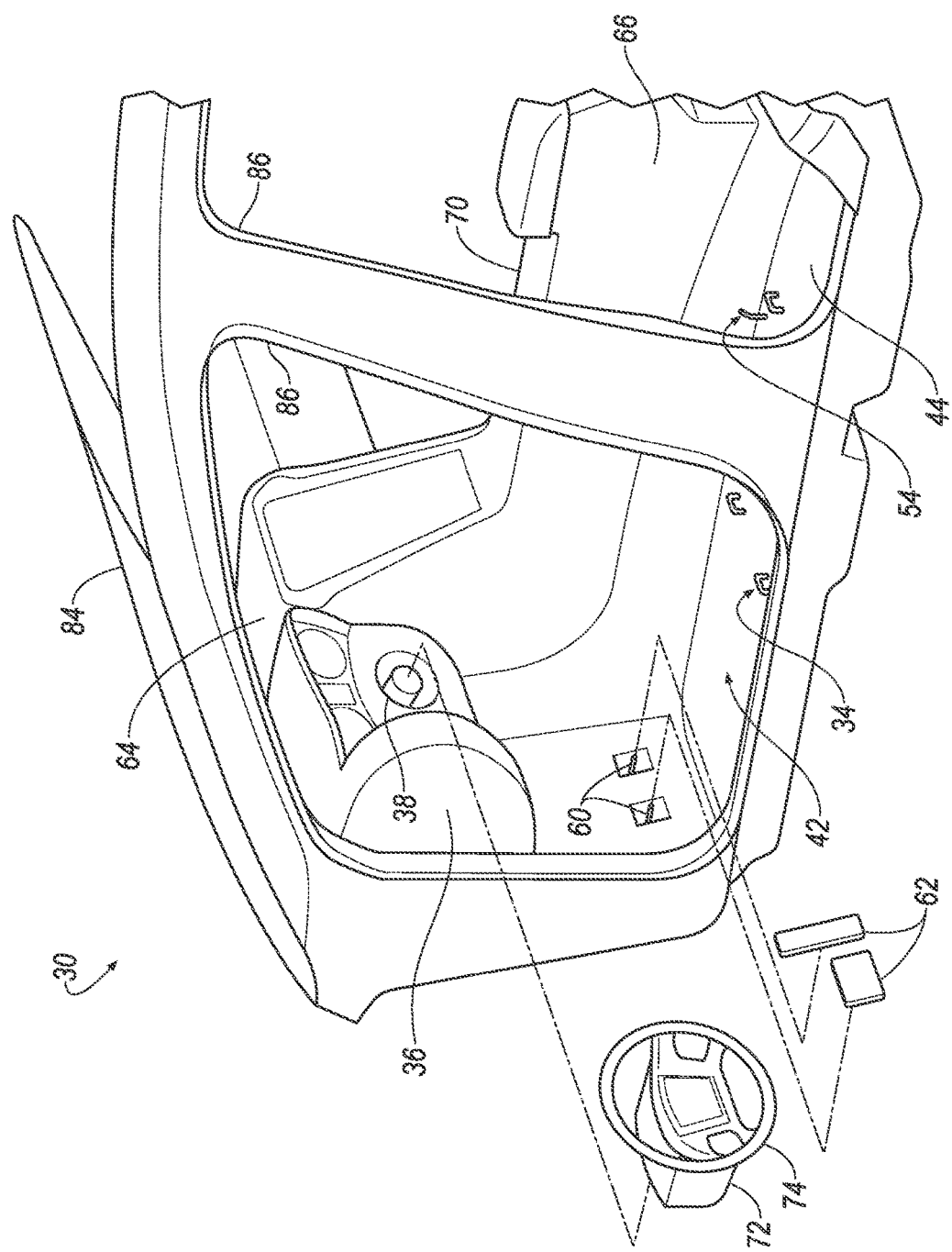
FIG. 3 is a side perspective view of a portion of the vehicle with the seat removed.
Figure 4:
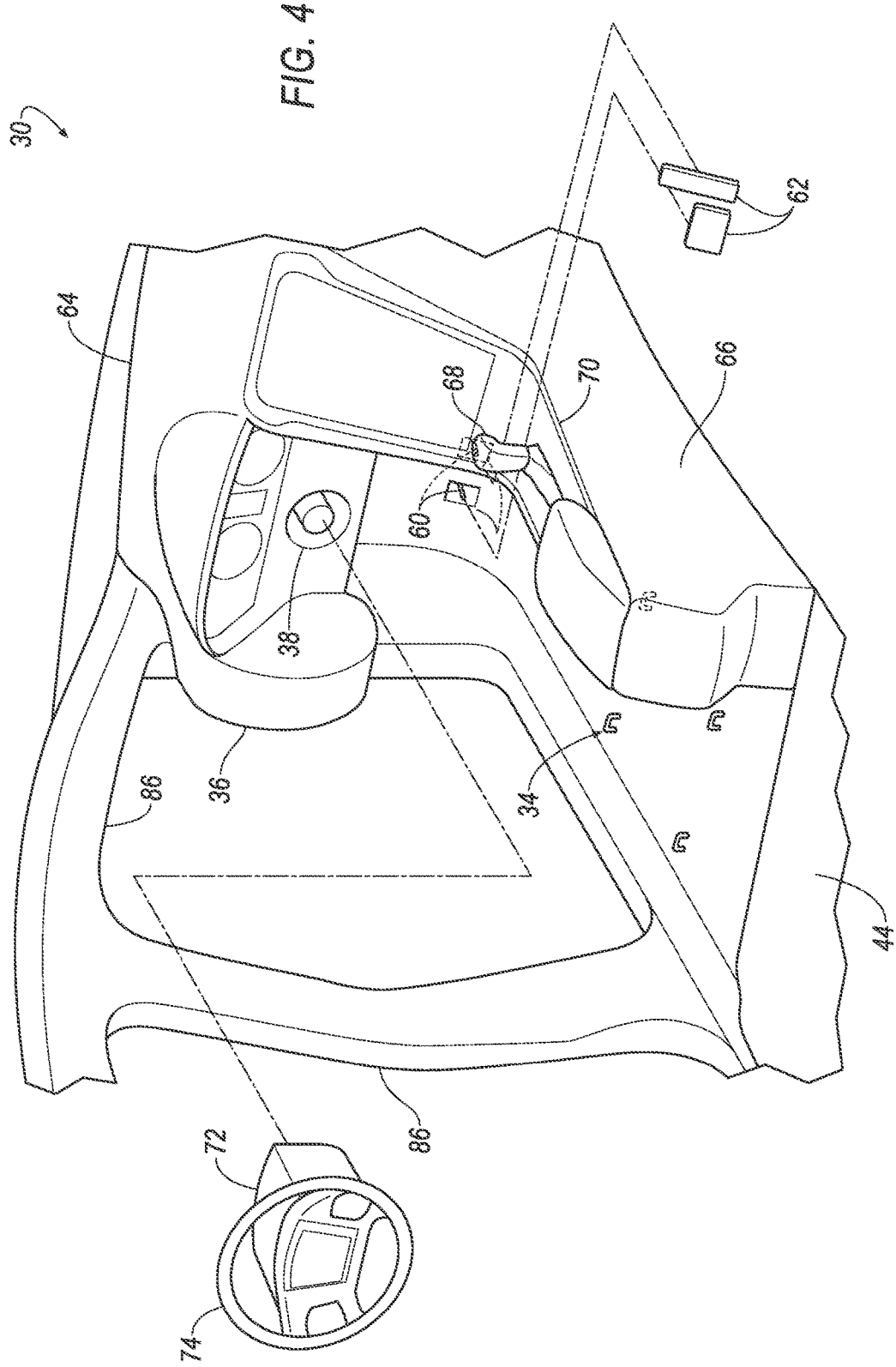
FIG. 4 is a rear perspective view of the passenger cabin of the vehicle with the seat removed.

With reference to FIGS. 3 and 4, the seat mount 34 is disposed on the floor 44 in the passenger cabin 42. The floor 44 may support the seat mount 34. The seat 46 may be attached to the seat mount 34, for example, a plurality of bolt holes, U-shaped striker to which a latch can attach, etc.

Figure 2:
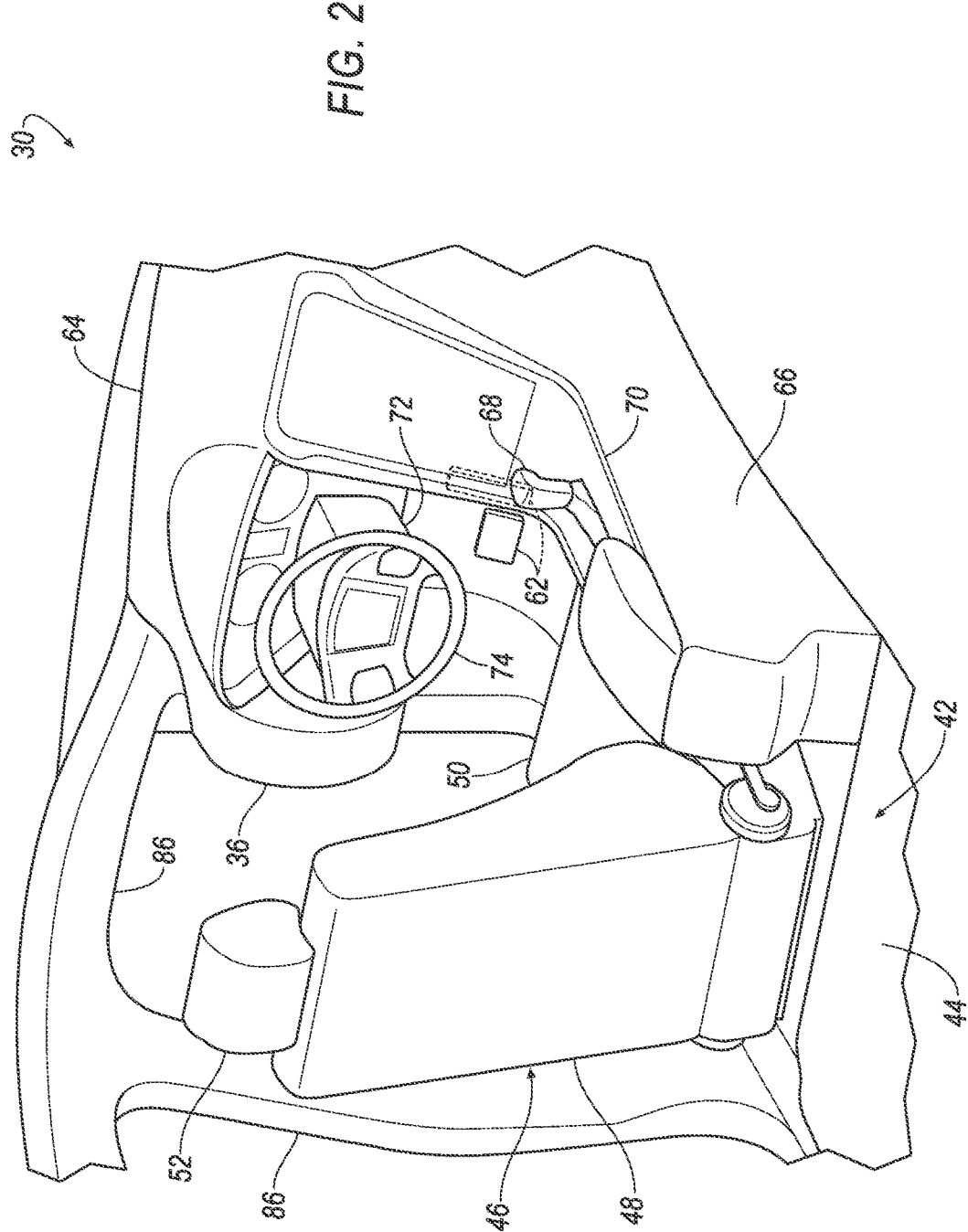
FIG. 2 is a rear perspective view of a passenger cabin of the vehicle including the seat.

With reference to FIGS. 1 and 2, the vehicle 30 may include one or more seats 46. Each seat 46 may include a seat back 48, a seat bottom 50, and a headrest 52. The headrest 52 may be supported by the seat back 48 and may be stationary or movable relative to the seat back 48. The seat back 48 may be supported by the seat bottom 50 and may be stationary or movable relative to the seat bottom 50. The seat back 48, the seat bottom 50, and/or the headrest 52 may be adjustable in multiple degrees of freedom. Specifically, the seat back 48, the seat bottom 50, and/or the headrest 52 may themselves be adjustable, in other words, adjustable components within the seat back 48, the seat bottom 50, and/or the headrest 52, and/or may be adjustable relative to each other.

At least one of the seats 46 is attachable to the seat mount 34. Specifically, the seat 46 may include bolts, latches, etc. (not shown) on an underside of the seat bottom 50 for attaching to the seat mount 34.

Figure 12:
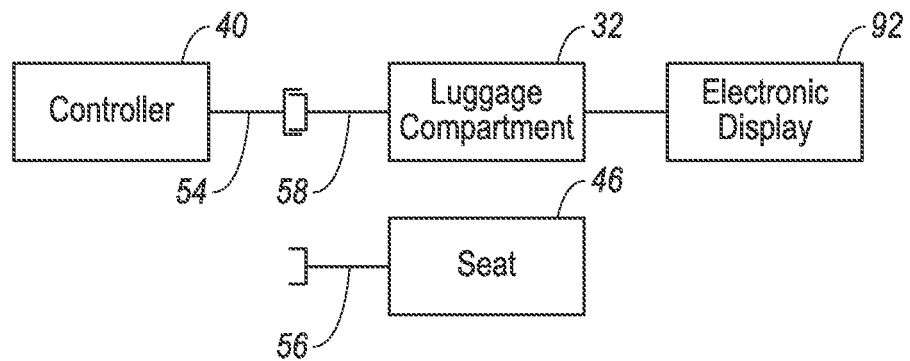
FIG. 12 is a block diagram of a control system of the vehicle.

With reference to FIGS. 3 and 12, the vehicle 30 may include wiring 54 extending from the floor 44 near the seat mount 34. The wiring 54 may be connectable to wiring 56 of the seat 46 or to wiring 58 of the luggage compartment 32. The wiring 54 may be in communication with the controller 40 of the vehicle 30.

With reference to FIGS. 3 and 4, the vehicle 30 may include pedal attachments 60 on the floor 44 below the instrument panel 36. Pedals 62 may be attached to the pedal attachments 60. The pedals 62 may include an accelerator pedal, a brake pedal, a clutch pedal, etc. When the pedals 62 are attached to the pedal attachments 60, a human operator of the vehicle 30 may use the pedals 62 to operate the vehicle 30, e.g., accelerate, brake, shift, etc. The pedals 62 may be removable from the pedal attachments 60. For example, the pedals 62 may be removably connected to the pedals attachments 60 with pins, quick disconnects, etc. (not shown).

With reference to FIGS. 1-4, the instrument panel 36 may extend across a front of the passenger cabin 42. A top 64 of the instrument panel 36 may be adjacent a windshield 84. The instrument panel 36 includes the steering-wheel opening 38. The instrument panel 36 may include vehicle controls, airbags, a glove compartment, air vents, etc.

A center console 66 may extend transverse to the instrument panel 36, i.e., in a vehicle-rearward direction. A shift lever 68 may be disposed on the center console 66, specifically, on a top 70 of the center console 66. A human operator of the vehicle 30 may use the shift lever 68 to operate the vehicle 30, e.g., shift a transmission of the vehicle 30 between neutral, park, reverse, and, for an automatic transmission, drive, or, for a manual transmission, various gears. The center console 66 may include vehicle controls, storage areas, etc.

With reference to FIGS. 3-4, the vehicle 30 may include a steering column 72 engageable with the instrument panel 36 through the steering-wheel opening 38. The vehicle 30 may include a steering wheel 74 engageable with the steering column 72. When the steering wheel 74 is engaged with the steering column 72 and the steering column 72 is engaged with the instrument panel 36, a human operator of the vehicle 30 may use the steering wheel 74 to operate the vehicle 30, e.g., turning front wheels (not shown) of the vehicle 30. The steering wheel 74 may be removable from the steering column 72. For example, the steering wheel 74 may be removably connected to the steering column 72 with pins, quick disconnects, etc. (not shown). The steering column 72 may be removable from the instrument panel 36. For example, the steering column 72 may be removably connected to the instrument panel 36 with pins, quick disconnects, etc. (not shown).

With reference to FIG. 12, the controller 40 is included in a vehicle-control system of the vehicle 30 for carrying out various operations, including as described herein. The controller 40 is a computing device that generally includes a processor and a memory, the memory including one or more forms of computer-readable media, and storing instructions executable by the processor for performing various operations, including as disclosed herein. The memory of the controller 40 further generally stores remote data received via various communications mechanisms; e.g., the controller 40 is generally configured for communications on a controller area network (CAN) bus or the like, and/or for using other wired or wireless protocols, e.g., Bluetooth, etc. The controller 40 may also have a connection to an onboard diagnostics connector (OBD-II). Via a vehicle network using Ethernet, WiFi, the CAN bus, Local Interconnect Network (LIN), and/or other wired or wireless mechanisms, the controller 40 may transmit messages to various devices in the vehicle 30 and/or receive messages from the various devices, e.g., controllers, actuators, sensors, etc., e.g., controllers and sensors as discussed herein. For example, the controller 40 may receive data from vehicle sensors. Although one controller 40 is shown in FIG. 12 for ease of illustration, it is to be understood that the controller 40 could include, and various operations described herein could be carried out by, one or more computing devices.

With reference to FIGS. 6-11, the luggage compartment 32 is attachable to the seat mount 34. For example, the luggage compartment 32 may include attachment features 94, e.g., bolts, latches, etc., on an underside of the luggage compartment 32 for attaching to the seat mount 34. The luggage compartment 32 may include the wiring 58 for connecting to the wiring 54 of the vehicle 30, as shown in FIG. 12. When the wiring 58 of the luggage compartment 32 is connected to the wiring 54 of the vehicle 30, the luggage compartment 32 may be in communication with the controller 40.

With continued reference to FIGS. 6-11, when the luggage compartment 32 is attached to the seat mount 34, the luggage compartment 32 may cover the steering-wheel opening 38, the top 70 of the center console 66, the shift lever 68, and the pedal attachments 60. The steering-wheel opening 38, the center console 66, the shift lever 68, and the pedal attachments 60 are thus inaccessible to occupants of the vehicle 30 when the luggage compartment 32 is attached to the seat mount 34.

Figure 5:
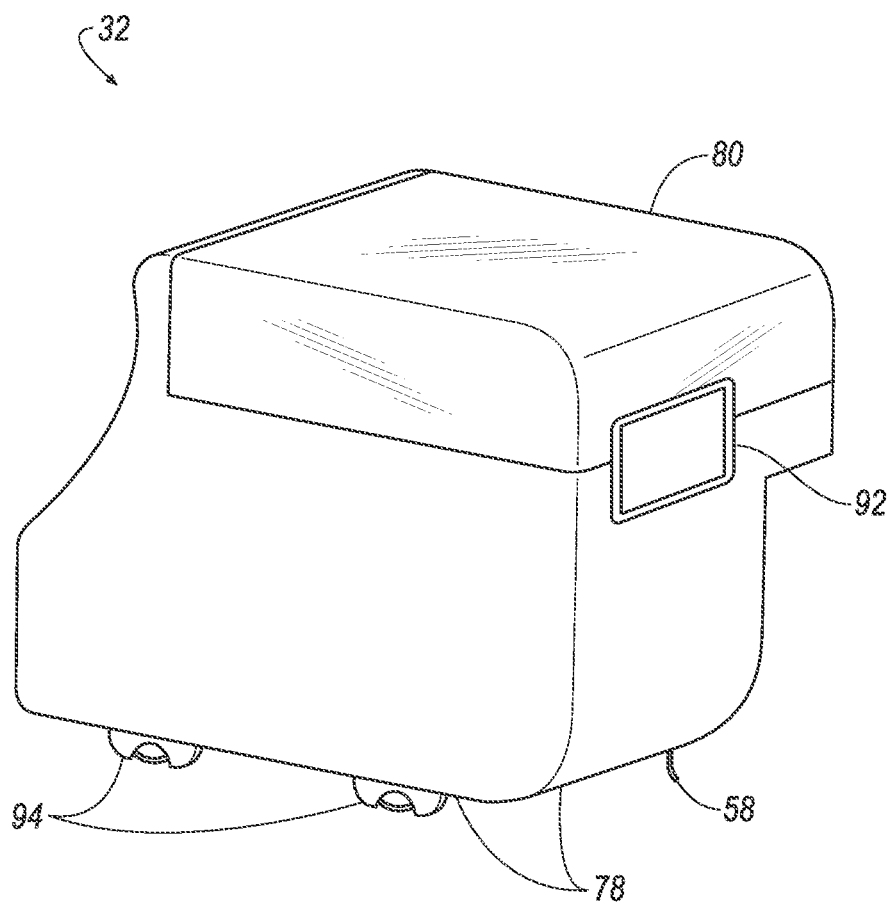
FIG. 5 is a perspective view of a luggage compartment.
Figure 6:
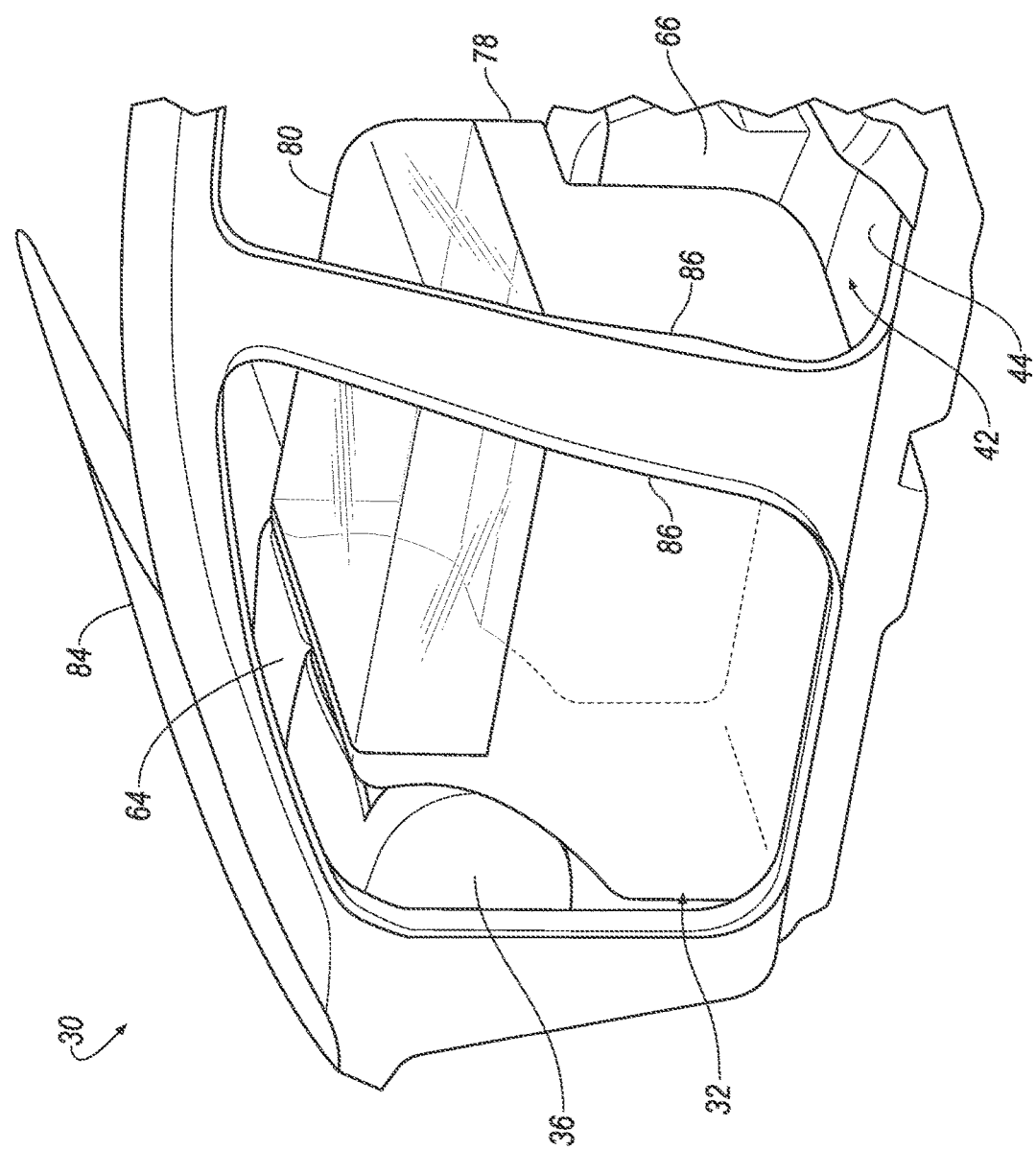
FIG. 6 is a side perspective view of a portion of the vehicle with the luggage compartment installed.
Figure 8:
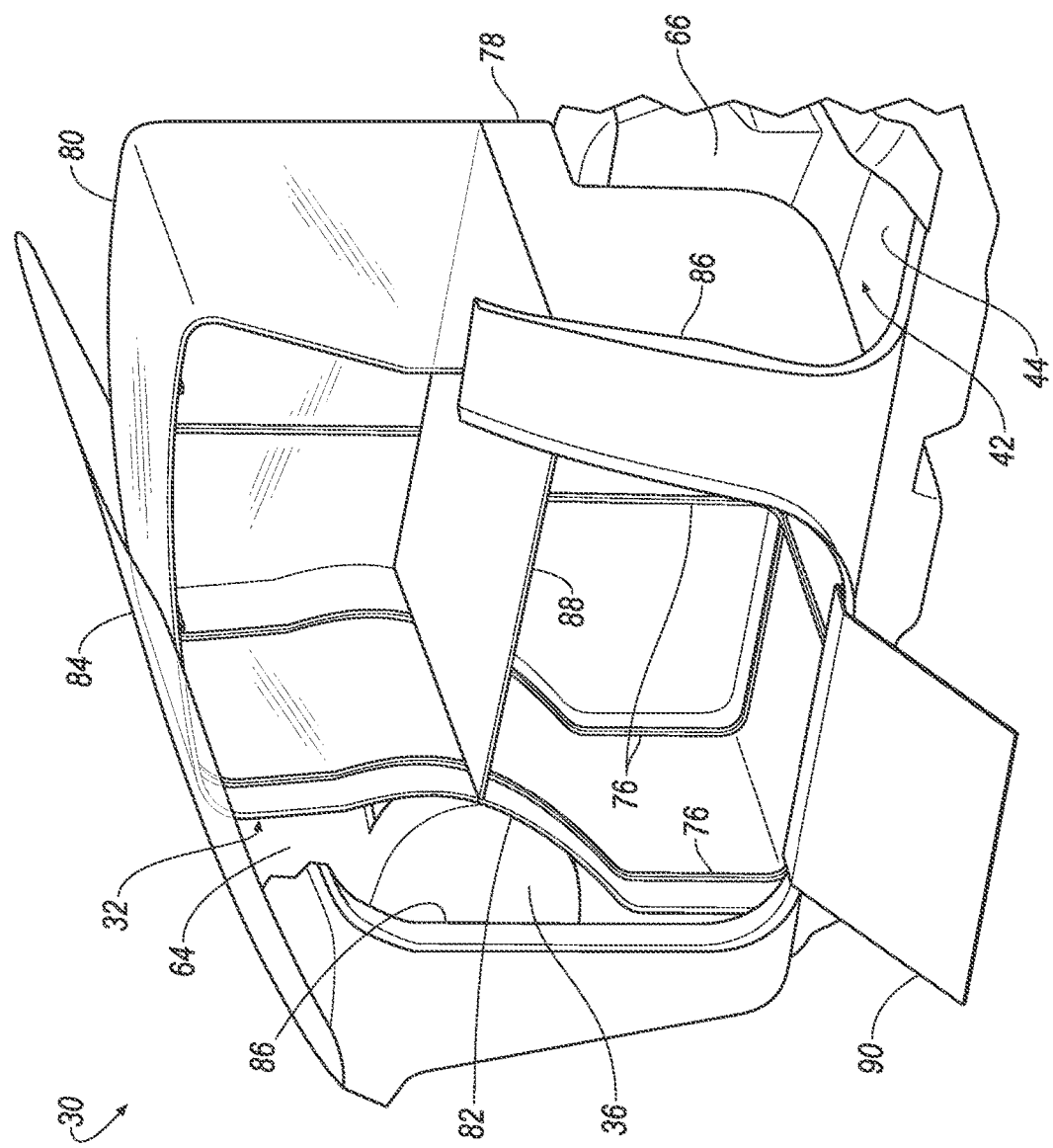
FIG. 8 is a side perspective view of a portion of the vehicle with an alternative luggage compartment installed.

With reference to FIGS. 5 and 8, the luggage compartment 32 may include supporting ribs 76, walls 78, a top portion 80, and an opening 82. The top portion 80 may be transparent. A height of the top portion 80 of the luggage compartment 32 relative to the floor 44 of the passenger cabin 42 may be substantially the same as a height of the top 64 of the instrument panel 36 relative to the floor 44 of the passenger cabin 42. An occupant may thus be able to see over the luggage compartment 32 through the windshield 84. Alternatively, the luggage compartment 32 may extend to a ceiling of the passenger cabin 42. An occupant may be able to see through the top portion 80 and the windshield 84. The opening 82 may face a doorway 86 of the vehicle 30.

The height of the luggage compartment 32 relative to the floor 44 may be adjustable. For example, the luggage compartment 32 may be adjustable vertically relative to the passenger cabin 42. For another example, the top portion 80 of the luggage compartment 32 may be adjustable relative to the walls 78 of the luggage compartment 32. The luggage compartment 32 may be adjustable relative to the floor 44 along the floor 44. For example, the luggage compartment 32 may be adjustable along a vehicle-forward direction.

With reference to FIG. 8, the luggage compartment 32 may include shelves 88. The luggage compartment 32 may be used by occupants to store luggage. Alternatively, the luggage compartment 32 may be equipped for specific types of cargo. For example, the luggage compartment 32 may include insulation and/or heating elements (not shown) for transporting hot cargo such as food for delivery. For another example, the luggage compartment 32 may include ventilation holes and/or cushions (not shown) for transporting household animals such as dogs or cats.

With reference to FIG. 8, the luggage compartment 32 may include a ramp 90. The ramp 90 may be foldable from an up position to a down position. In the up position, the ramp 90 may cover, partially or entirely, the opening 82 of the luggage compartment 32 and allow a door (not shown) to close in the doorway 86. In the down position, the ramp 90 may extend from the luggage compartment 32 to ground outside the vehicle 30, allowing occupants to move cargo up the ramp 90 and into the luggage compartment 32.

Figure 10:
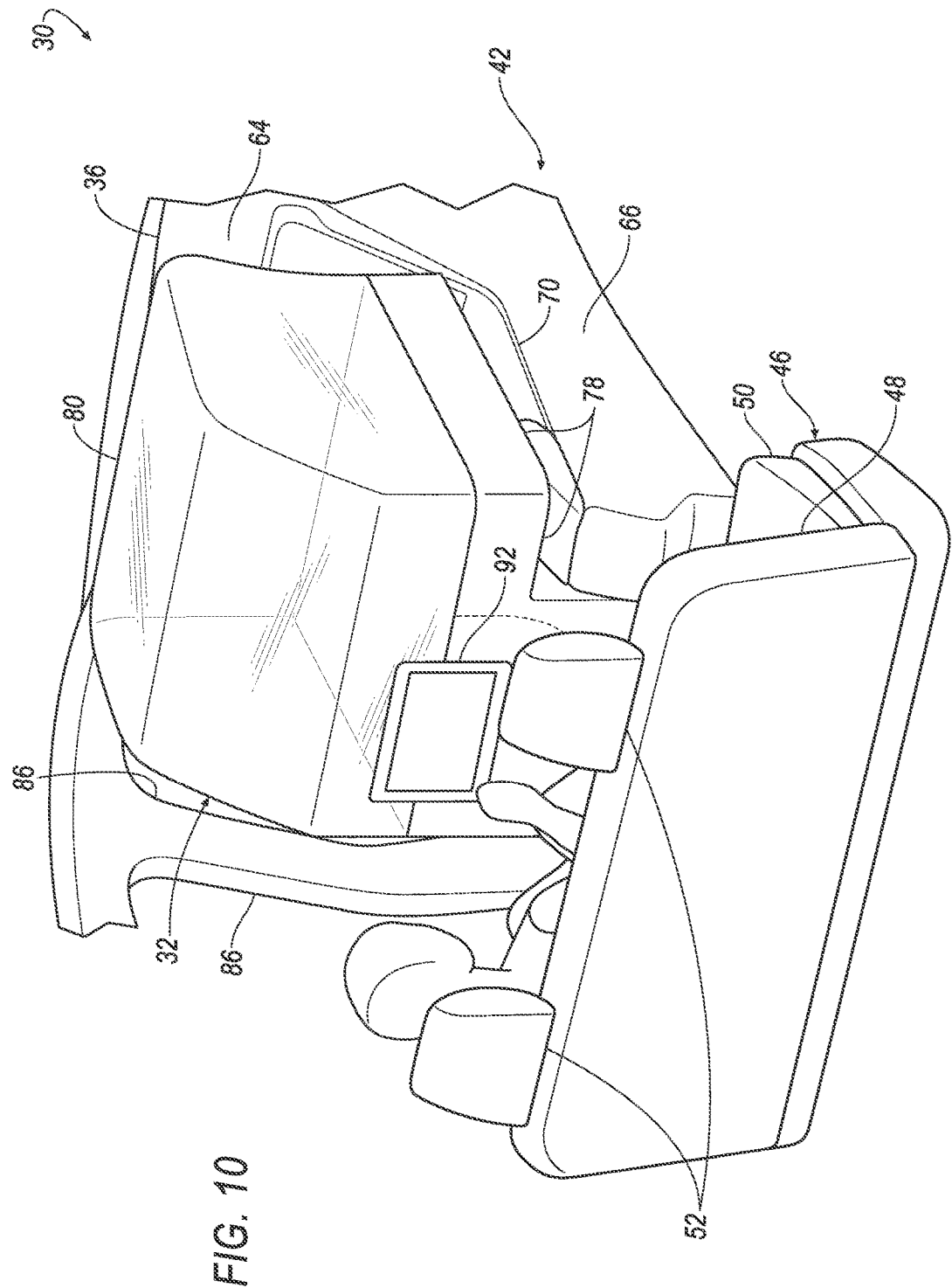
FIG. 10 is a rear perspective view of the passenger cabin of the vehicle with the luggage compartment of FIG. 8 installed.
Figure 11:
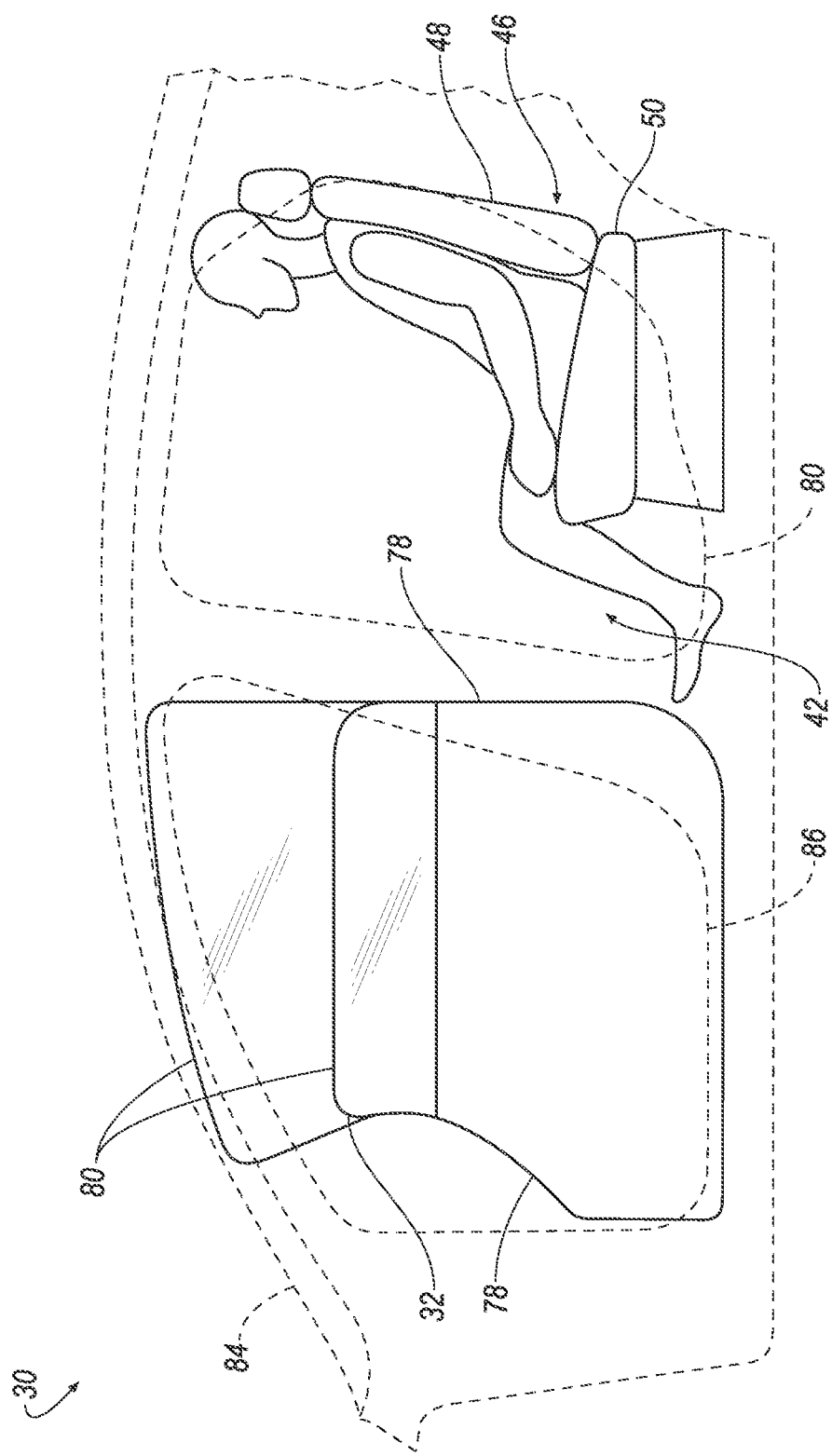
FIG. 11 is a side view of the passenger cabin of the vehicle with the luggage compartment and the alternative luggage compartment superimposed.

With reference to FIGS. 5 and 10, the luggage compartment 32 may include an electronic display 92. The electronic display 92 may display information to occupants. The electronic display 92 may be, for example, an LCD screen. The electronic display 92 may accept inputs from the occupants, for example, via a touchscreen. The occupants may be able to, for example, adjust the luggage compartment 32 via the electronic display 92.

Figure 13:
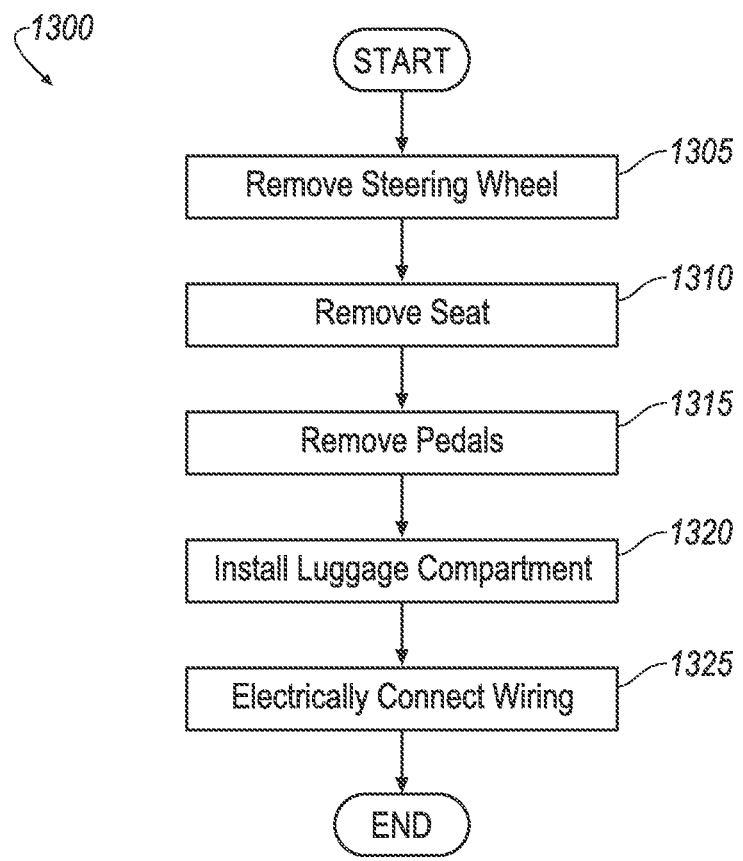
FIG. 13 is a flow diagram of a process for transforming a vehicle to support the luggage compartment.

FIG. 13 is a process flow diagram of an exemplary process 1300 for transforming the vehicle 30 to include the luggage compartment 32. The process 1300 begins in a block 1305, in which the steering wheel 74 is removed from the steering-wheel opening 38 of the vehicle 30, as shown in FIGS. 3 and 4. The steering column 72 may also be removed from the steering-wheel opening 38.

Next, in a block 1310, the seat 46 is removed from the seat mount 34 of the vehicle 30. Specifically, the driver seat 46 may be removed; that is, the seat 46 located adjacent in a vehicle-rearward direction from the steering-wheel opening 38 may be removed.

Next, in a block 1315, at least one pedal 62 is removed from the pedal attachment 60 of the vehicle 30. All pedals 62 may be removed from all pedal attachments 60, as shown in FIGS. 3 and 4.

Figure 7:
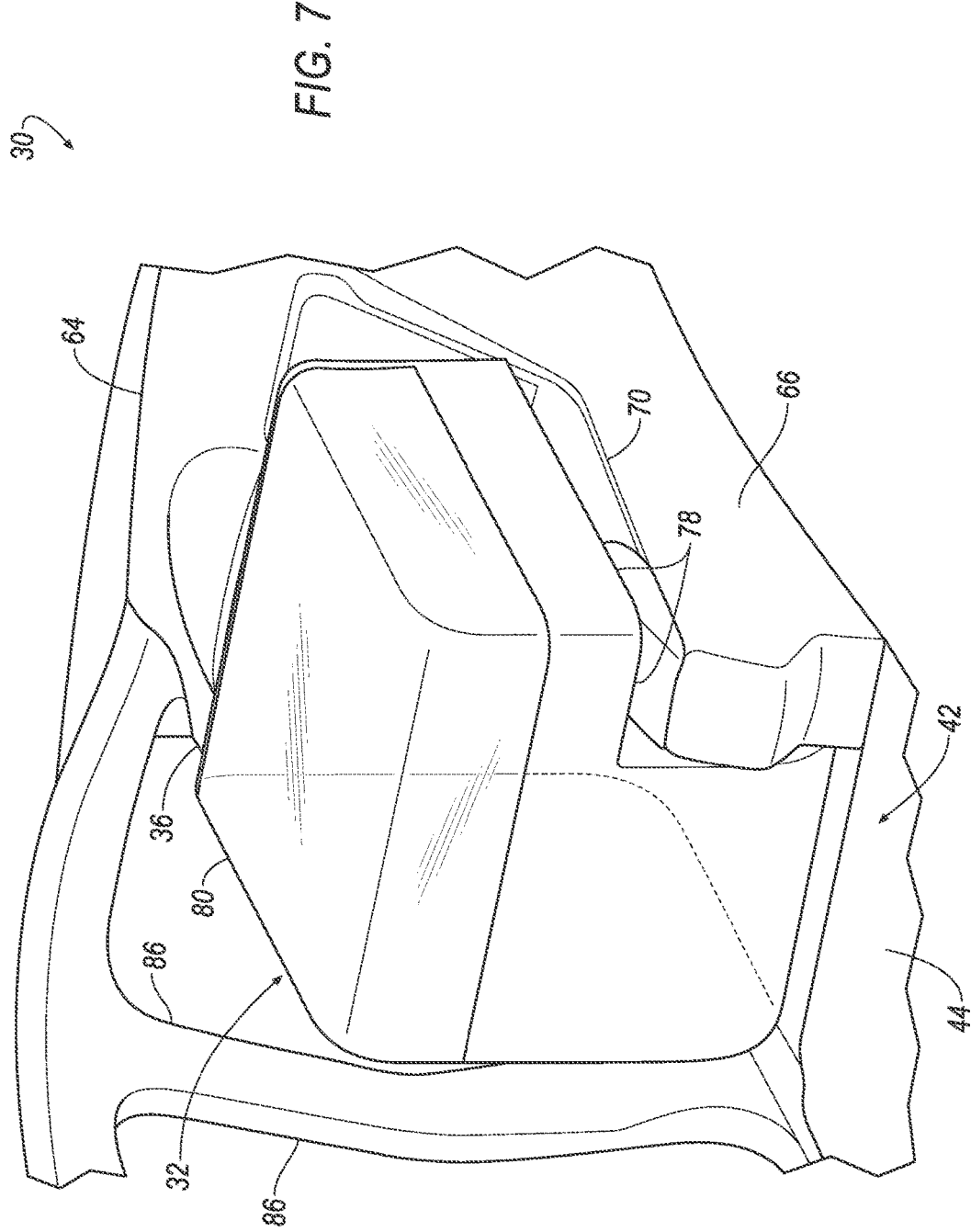
FIG. 7 is a rear perspective view of the passenger of the vehicle with the luggage compartment installed.
Figure 9:
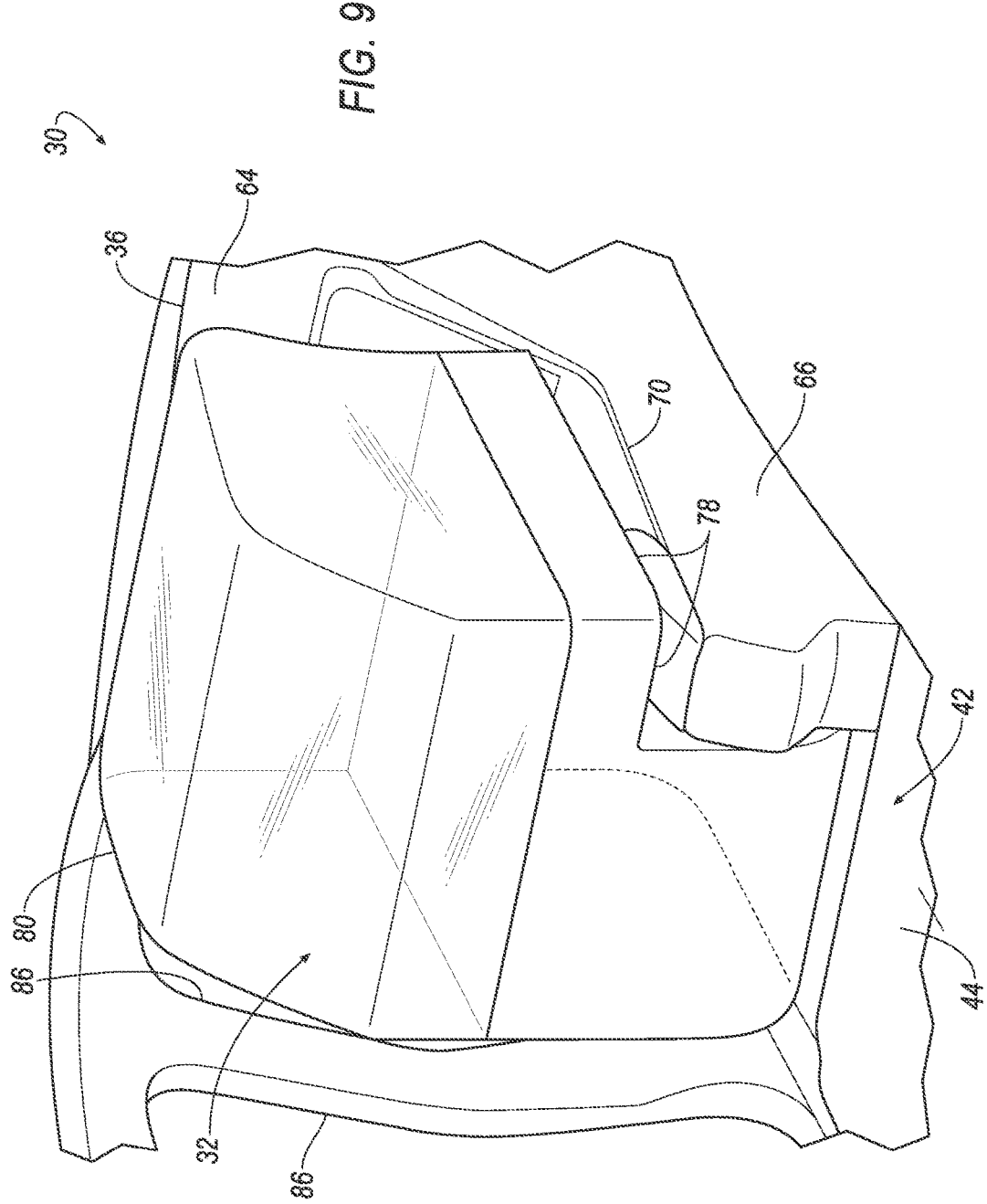
FIG. 9 is a rear perspective view of the passenger cabin of the vehicle with the luggage compartment of FIG. 8 installed.

Next, in a block 1320, the luggage compartment 32 is installed to the seat mount 34 with the luggage compartment 32 covering the steering-wheel opening 38. The luggage compartment 32 may also cover the top 70 of the center console 66, the shift lever 68, and the pedal attachments 60, as shown in FIGS. 7 and 9. The luggage compartment 32 may thus prevent occupants from accessing controls for operating the vehicle 30.

Next, in a block 1325, the wiring 58 of the luggage compartment 32 is electrically connected to the wiring 54 of the vehicle 30, as shown in FIG. 12. After the block 1325, the process 1300 ends.

The process 1300 may be reversible. That is, the luggage compartment 32 may be removed from the vehicle 30, and the pedals 62, seat 46, and steering wheel 74 may be reattached.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
    a seat mount;
    an instrument panel having a steering-wheel opening; and
    a luggage compartment attachable to the seat mount and covering the steering-wheel opening when attached to the seat mount.

2. The vehicle of claim 1, further comprising a center console extending transverse to the instrument panel, wherein the luggage compartment covers a top of the center console.

3. The vehicle of claim 2, further comprising a shift lever on the center console, and the luggage compartment covers the shift lever.

4. The vehicle of claim 1, further comprising a pedal attachment below the instrument panel, wherein the luggage compartment covers the pedal attachment.

5. The vehicle of claim 1, wherein the luggage compartment includes an electronic display.

6. The vehicle of claim 1, further comprising a controller, wherein the luggage compartment is in communication with the controller.

7. The vehicle of claim 1, further comprising a floor supporting the seat mount, wherein a height of the luggage compartment relative to the floor is adjustable.

8. The vehicle of claim 1, further comprising a floor supporting the seat mount, wherein the luggage compartment is adjustable relative to the floor along the floor.

9. The vehicle of claim 1, wherein a top portion of the luggage compartment is transparent.

10. The vehicle of claim 1, further comprising a seat, the seat and the luggage compartment being alternately attachable to the seat mount.

11. The vehicle of claim 1, further comprising a steering column engageable with the instrument panel through the steering-wheel opening.

12. The vehicle of claim 1, further comprising a floor supporting the seat mount, wherein a height of a top of the luggage compartment relative to the floor is substantially the same as a height of a top of the instrument panel relative to the floor.

13. A method of transforming a vehicle comprising:
    removing a steering wheel from a steering-wheel opening of the vehicle;
    removing a seat from a seat mount of the vehicle; and
    installing a luggage compartment to the seat mount with the luggage compartment covering the steering-wheel opening.

14. The method of claim 13, wherein the luggage compartment covers a top of a center console extending transverse to an instrument panel including the steering-wheel opening when installed to the seat mount.

15. The method of claim 14, wherein the vehicle includes a shift lever on the center console, and the luggage compartment covers the shift lever when installed to the seat mount.

16. The method of claim 13, further comprising removing at least one pedal from a pedal attachment of the vehicle, wherein the luggage compartment covers the pedal attachment when installed to the seat mount.

17. The method of claim 13, wherein the luggage compartment includes an electronic display.

18. The method of claim 13, further comprising electrically connecting wiring of the luggage compartment to wiring of the vehicle.

19. The method of claim 13, wherein a top portion of the luggage compartment is transparent.

20. The method of claim 13, wherein a height of the luggage compartment relative to a floor is substantially the same as a height of the instrument panel relative to the floor.

* * * * *